United States Patent [19]

O'Brien

[11] 4,024,495
[45] May 17, 1977

[54] REMOTE TEMPERATURE CHANGE WARNING SYSTEM

[76] Inventor: Frank J. O'Brien, 125 Mira St., Foster City, Calif. 94404

[22] Filed: Dec. 29, 1975

[21] Appl. No.: 644,593

[52] U.S. Cl. .............................. 340/57; 340/227 R; 340/416; 332/20
[51] Int. Cl.² .......................................... B60Q 1/00
[58] Field of Search ............ 340/227 R, 228 R, 57, 340/416; 331/66, 64; 332/20

[56] References Cited
UNITED STATES PATENTS

| | | | |
|---|---|---|---|
| 3,594,752 | 7/1971 | Alton | 340/228 R |
| 3,631,433 | 12/1971 | Dix | 340/216 |
| 3,753,259 | 8/1973 | Donovan | 340/228 R |
| 3,872,728 | 3/1975 | Joyce | 331/66 |
| 3,906,391 | 9/1975 | Murdock | 331/66 |
| 3,927,399 | 12/1975 | Fozzell | 340/228 R |
| 3,931,619 | 1/1976 | Moore | 340/228 R |

Primary Examiner—John W. Caldwell
Assistant Examiner—William M. Wannisky
Attorney, Agent, or Firm—Townsend and Townsend

[57] ABSTRACT

A remote temperature change warning system for a refrigeration vehicle comprised of a temperature sensing circuit located in the refrigeration compartment of the refrigeration vehicle and a detection circuit located on the vehicle remote from the temperature sensing circuit and having means for indicating to the vehicle operator the temperature condition in the refrigeration compartment, the output of the temperature sensing circuit and the input of the remote detection circuit being electrically connected through the existing electrical wiring of said refrigeration vehicle.

4 Claims, 3 Drawing Figures

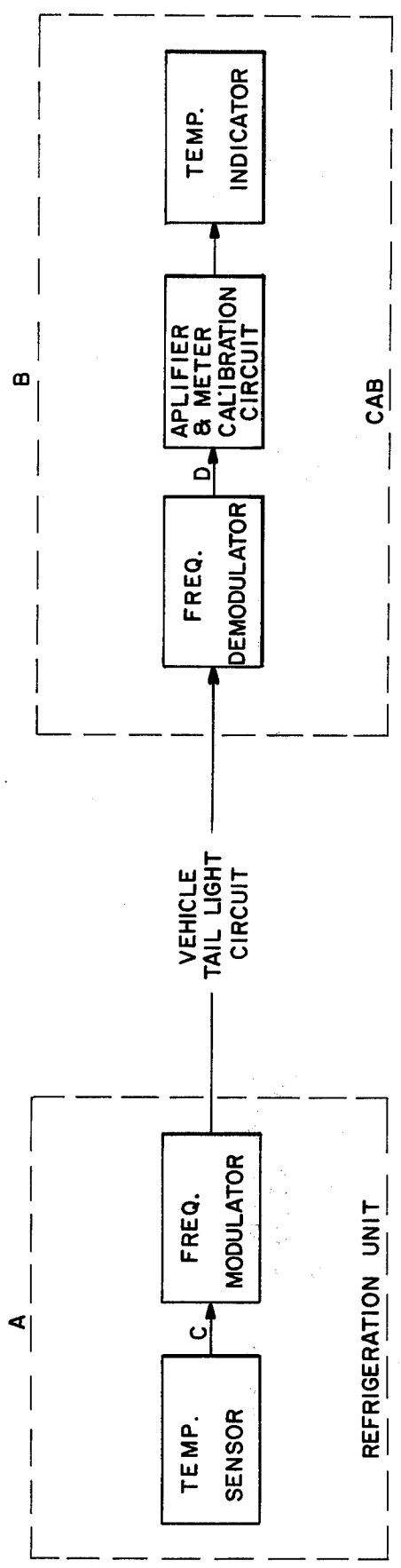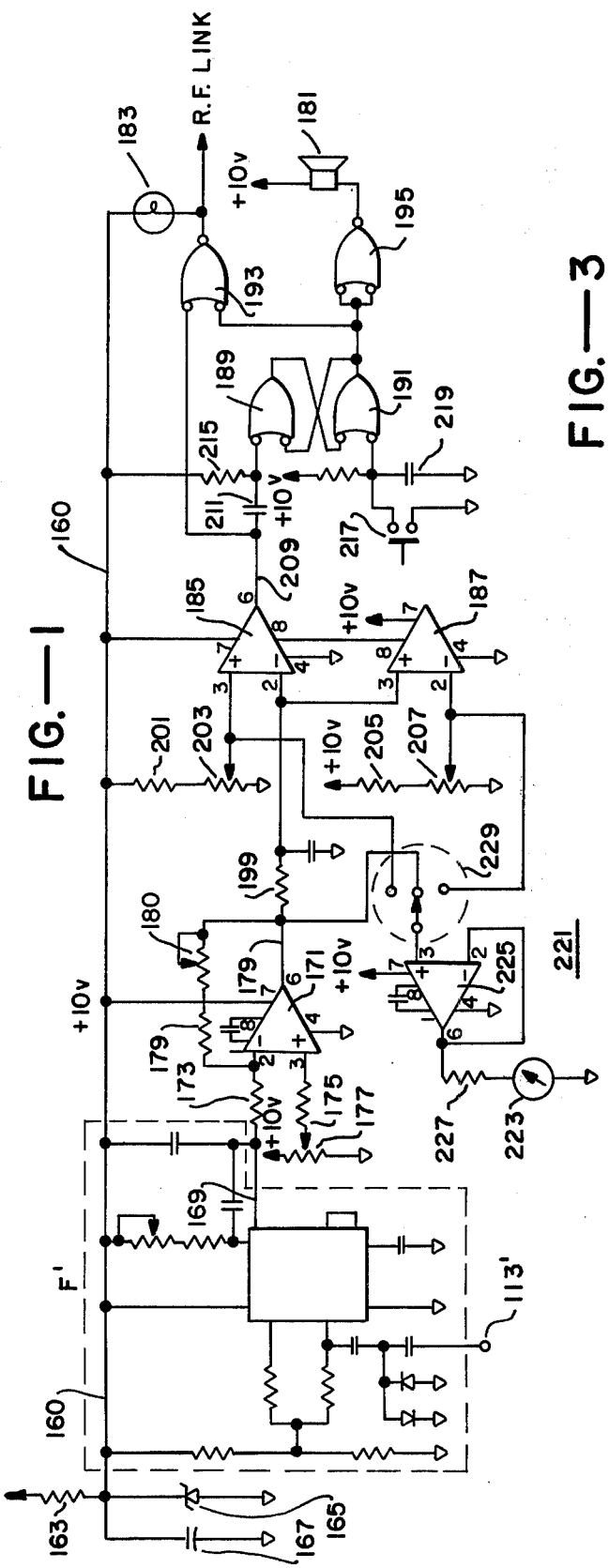

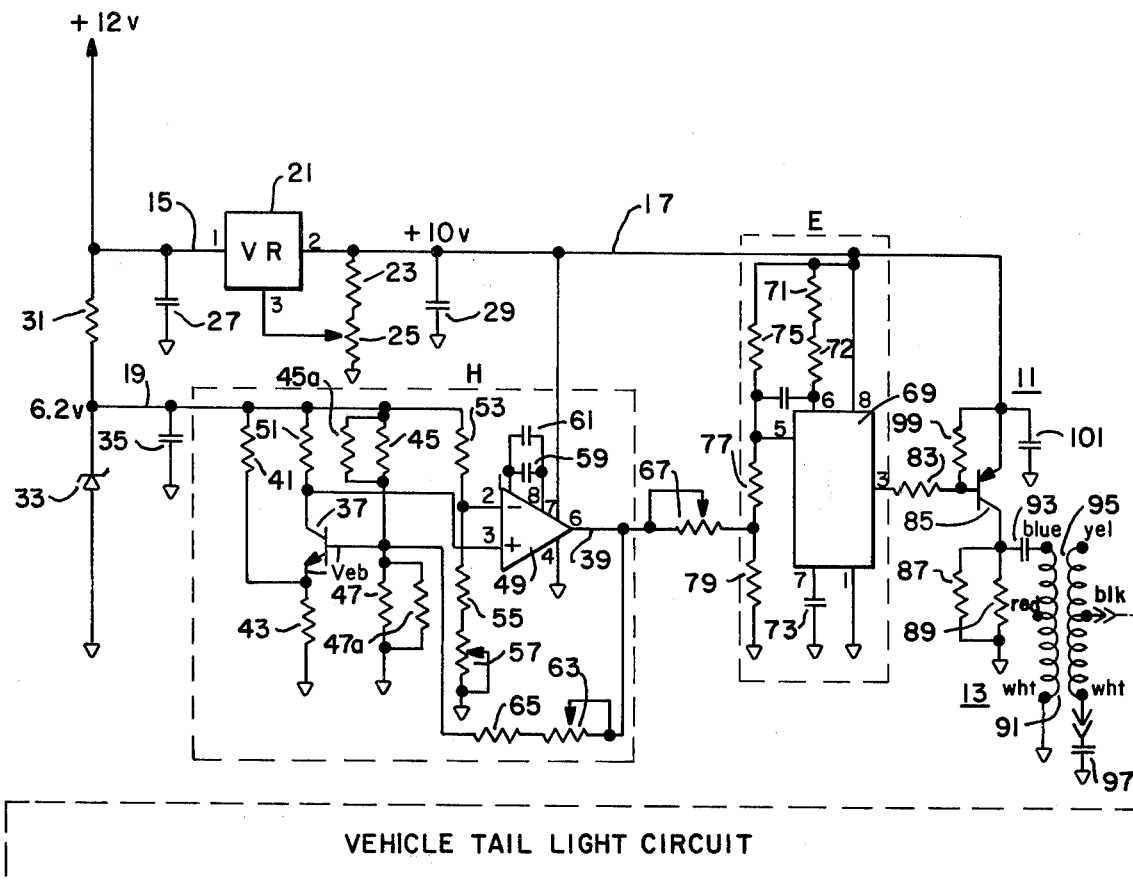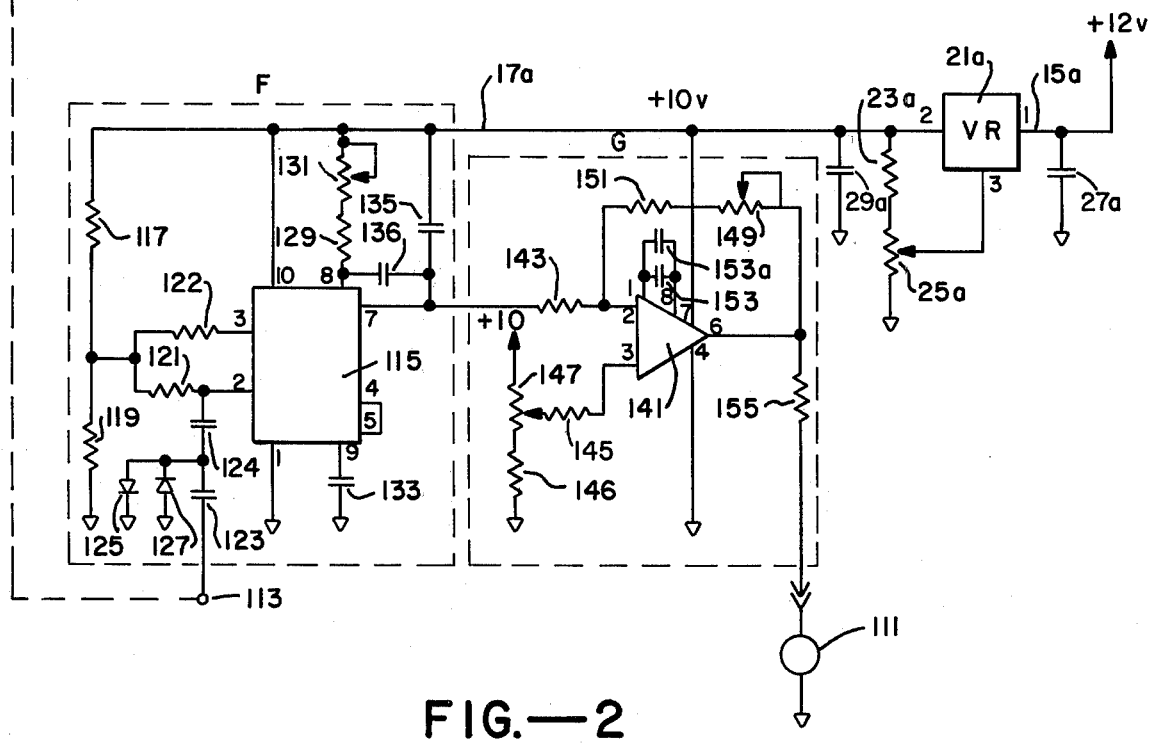
FIG.—2

REMOTE TEMPERATURE CHANGE WARNING SYSTEM

BACKGROUND OF THE INVENTION

FIELD OF INVENTION

The present invention relates to electrical temperature sensing devices and more particularly to a remote temperature warning system for a refrigeration vehicle which utilizes the existing wiring of the vehicle. 2. Description of Prior Art An indispensible requirement for transporting perishable food items, or the like, is a carefully controlled temperature environment. Refrigerated transportation vehicles such as a refrigeration truck provided such a controlled environment, but only to the extent that the temperature control system of the vehicle is operating properly. It all too often happens, with substantial monetary losses, that a refrigeration vehicle operator will operate his vehicle for a considerable length of time totally unaware that a malfunction in the temperature control system has occurred.

Present temperature control systems have temperature indicating means affixed directly to the refrigeration compartment of the vehicle in direct connection with the temperature sensors inside the compartment. Such a device is disclosed in U.S. Pat. No. 3,594,752 to Alton. Alton includes a temperature sensitive thermistor electrically connected to an externally disposed alarm unit through a hole drilled in the refrigeration vehicle wall to which the device is mounted. The mounting of such a device thus requires modification to the compartment wall and contemplates that the thermistor element be disposed proximate the alarm unit.

It is advantageous, however, to provide a temperature change warning system wherein the temperature indication means can be remotely placed from the temperature sensing device and be installed without having to substantially rewire or otherwise modify the vehicle. It is further advantageous to provide such an easily installed device having a remote preferably visual temperature indication means installed within the cab of the vehicle for continued monitoring while the vehicle is being operated, as well as an audio alarm on the refrigeration compartment for warning of a temperature control system malfunction when the vehicle is not being operated and the driver is outside the cab.

The present invention is a temperature change warning device which provides remote temperature sensing with high reliability and which can be easily installed on a vehicle having an existing refrigeration control unit with minimal wiring and minimum modification to that vehicle.

SUMMARY OF INVENTION

The present invention is a remote temperature change warning system for a refrigeration vehicle comprised of a temperature sensing circuit located in the refrigeration compartment of the refrigeration vehicle, and a detection circuit located on the refrigeration vehicle remote from the temperature sensing circuit. The detection circuit includes a means, preferably both a visual and audio means, for indicating to the vehicle operator the temperature condition in the refrigeration compartment as sensed by the temperature sensing circuit. The temperature sensing circuit and the detection circuit, which includes the means for warning the vehicle operator of a malfunction in the vehicle's temperature control system, are electrically connected through the existing electrical wiring, preferrably the tail light or running light circuit, of the vehicle.

OBJECTS OF THE INVENTION

It is therefore an object of the present invention to provide a remote temperature change warning system for a refrigeration vehicle which can be easily installed without substantial modification to the vehicle.

It is another object of the present invention to provide a remote temperature change warning system for a refrigeration vehicle which utilizes the existing wiring of the vehicle.

It is a further object of the present invention to provide a remote temperature change warning system for a refrigeration vehicle wherein a remotely located temperature condition indication means can be continually monitored by the vehicle operator.

It is still another object of the present invention to provide a remote temperature change warning system wherein using existing vehicle wiring an accurate temperature condition indication can be given.

Other objects of the present invention will become apparent from the following description of the preferred embodiment of the invention.

DESCRIPTION OF THE DRAWINGS

FIG. 1 is a block diagram showing the overall electrical configuration of the present invention.

FIG. 2 is a schematic drawing of the electrical circuitry of the present invention showing the temperature sensing circuit connected to the detection circuit through the vehicle tail light or running light circuit.

FIG. 3 is a schematic drawing of the electrical circuitry of the alarm module of the present invention.

DESCRIPTION OF PREFERRED EMBODIMENT

Referring now to FIG. 1 of the drawings, it can be seen that the remote temperature change warning system of the present invention is essentially comprised of a temperature sensing circuit A mounted within the refrigeration unit of the refrigeration vehicle, and detection circuit B mounted in the cab of the vehicle remote from the temperature sensing circuit and electrically connected to temperature sensing circuit A through existing wiring in the vehicle. It is contemplated that the present invention will be used on a refrigeration truck utilizing the vehicle's tail light or running light circuit, however, it is understood that the invention can be adapted to other types of vehicles, such as railroad refrigeration units, aircraft or ships, using other types of vehicular wiring. It is also understood that all future references to "tail light circuit" are meant to include the vehicle's running light circuit.

Temperature sensing circuit A is essentially divided into two functional units as shown in FIG. 1. The first is the temperature sensor comprising a temperature sensitive electrical element, such as a thermistor or preferably a silicon semiconductor transducer, which generates an output voltage C proportional to the temperature within the refrigeration unit. Output voltage C is then fed to the frequency modulator portion of the detector circuit to develop an ac signal having a frequency proportional to output voltage C and hence proportional to the refrigeration unit's temperature.

The block diagram of FIG. 1 shows that the frequency modulated signal developed at the output of the temperature sensing circuit is transmitted to the detection circuit located in the cab of the vehicle through the vehicle's tail light circuit. The detection circuit includes a frequency demodulation circuit the input to which is connected to the tail light circuit for receiving the frequency modulated signal. A dc voltage D is generated at the output of the frequency demodulated which has a magnitude proportional to the modulated output voltage C from the temperature sensor of the temperature sensing circuit; the magnitude of this dc output is thus a direct indication of the temperature within the refrigeration unit. Output voltage D, because of the use of a frequency modulated transmission signal, will not be affected by other dc voltages developed during the normal operation of that tail light circuit. As seen from FIG. 1, the detector circuit also includes an amplification and calibration circuit. This circuit provides enough power to drive the indication means and also provides a means for calibrating the temperature indicator in accordance with ambient temperature conditions in the refrigeration unit. The mounting of the temperature indicator is such that it can be continually monitored by the vehicle operator for temperature changes which would indicate a malfunction in the vehicle's refrigeration temperature control system.

Referring now to FIG. 2, there is shown a detailed schematic drawing of the temperature sensing circuit A and the detection circuit B. It is seen again that the output of the temperature sensing circuit is electrically connected to the input of the detection circuit through the vehicle tail light circuit. Referring to the temperature sensing circuit shown at the top portion of the drawing, the circuit is essentially divided into two portions: a temperature transducer circuit H, and a frequency modulation circuit E. The circuitry of the temperature sensing circuit is shown in its preferred form wherein the output of the frequency modulating circuit is amplified by amplifier circuit 11 the output of which is coupled through transformer 13 to the vehicle tail light circuit. Transformer 13 is chosen so as to match the output impedance of the amplifier circuit to the impedance of the tail light thereby maximizing available power transfer. Temperature sensing circuit A, in the preferred embodiment, is connected through power lines 15, 17, 19 to a 12 volt positive dc voltage supply, such as would be provided by a standard car battery. It is seen that the 12 volts developed on power line 15 is preferably reduced to 10 volts on power line 17 for driving both the frequency modulation circuit E and amplifier circuit 11, and preferably reduced to 6.2 volts at power line 19 for driving the temperature transducer circuit H. A three terminal voltage regulator 21 is connected between power lines 15 and 17 to achieve the preferred voltage reduction at power line 17. An 8 volt integrated circuit series regulator can be used, such as commonly available manufacturer's type 78L08, the output of which, shown as terminal 2 in the drawing, is shunted to ground through fixed resistor 23 and variable resistor 25; the center tap of variable resistor 25 is connected to terminal 3 of the voltage regulator whereby an adjustment of the variable resistor acts to control the output voltage at terminal 2. In accordance with the stated preferred voltage requirement on power line 17, variable resistor 25 is adjusted to provide a regulated voltage value of 10 volts. To prevent the adverse effects of transient voltages on circuit power lines 15 and 17, these lines are capacitively coupled to ground through filter capacitors 27 and 29.

The voltage developed on power line 15 is also reduced through resistor 31 and is regulated by ground connected zener diode 33 such that the voltage impressed on power line 19 is held at a constant value of 6.2 volts, the above-stated preferred value for driving transducer circuit H. Filter capacitor 35 is further provided to protect power line 19 from voltage transients.

Temperature transducer circuit H is a known circuit utilizing the characteristic that a base/emitter voltage of a transistor varies directly with temperature. Specifically, the circuit utilizes the temperature sensitive base/emitter voltage of NPN transistor 37. The base/emitter voltage of transistor 37 is not directly useable because of the difference from one transistor to the next in the proportional relationship of temperature to voltage. It is known that a single production run of transistors can produce for a particular temperature a Vbe which differs as much as plus or minus 100 millivolts. To factor out this variation, a known self-adjusting bridge circuit with negative feedback is utilized which maintains the base current of the transistor at a constant level and in which there is achieved a circuit ouput voltage at 39 proportional to the absolute temperature times the closed loop gain of the feedback circuit. Essentially the balance circuit is seen as resistors 41 and 43 connecting the emitter side of transistor 37 to power line 19 and ground, respectively, and the connection of the transistor base to power line 19 and ground through the parallel resistor combinations 45, 45a and 47, 47a; the collector of transistor 37 is connected directly to input pin 3 of operational amplifier 49, as well as to input pin 2 thereof through resistors 51 and 53 with input pin 2 additionally being grounded through fixed resistor 55 and series connected potentiometer 57.

Operational amplifier 49, preferably generally available manufacturer's type LM301 and shown with the customary pin notation, is additionally wired as shown with filter capacitors 59 and 61 connected in parallel across pins 1 and 8, power line 17 connected to pin 7, and pin 4 grounded. The output voltage of operational amplifier 49, developed at pin 6, is fed back to the base of transistor 37 through series connected potentiometer 63 and fixed resistor 65 to provide a negative feedback for controlling the transistor's base current. The gain of the circuit can be adjusted by sensitivity potentiometer 63; the linearity of the ouput at 39 can additionally be controlled by adjustment of potentiometer 57. Specifically, through potentiometer 57, the collector base voltage can be adjusted to zero thereby eliminating the collector base leakage current.

The above-described temperature transducer circuit is set forth and analyzed in an article appearing in the Mar. 28, 1975, edition of Electronics Magazine at page 127. The preferred values of the passive elements of the temperature transducer circuit have essentially been adopted with reference to the analyzed circuit in the Electronics Magazine article, and are listed below for convenience:

| | | |
|---|---|---|
| R41-3.32K | R51-51.1K | R65-301K |
| R43-2.0K | R53-51.1K | C59-1uf |
| R45-51.1K | R55-301K | C61-1uf |
| R45A-240K | R57-20K | |
| R47-51.1K | R63-500K | |

The output voltage developed at 39, which as stated is proportional to the absolute temperature at transistor 37, is connected to the input of the frequency modulation circuit E through potentiometer 39 the adjustment of which allows the frequency modulation circuit to be driven at a suitable operating level. Frequency modulation circuit E is principally comprised of voltage control oscillator 69 available in the form of a standard integrated circuit, preferably a Signetics 566 voltage control oscillator, having pins numbered as shown. The peripheral circuitry of the voltage control oscillator 69 comprises the connection of pin 8 of the VCO to 10 volt power line 17 for powering the oscillator, and an RC tuning circuit essentially consisting of variable resistor 71 and fixed resistor 72 series connected between pin 6 of voltage control oscillator 69 and power line 17 and capacitor 73 connected between pin 7 and ground. The center frequency of the voltage control oscillator is determined by the RC time constant of elements 71, 72, 73 and can be tuned by adjustment of variable resistor 71. For biasing to the linear range of voltage control oscillator 69, resistors 75, 77, and 79 are connected as shown between power line 17, pin 5 and ground. To prevent the occurence of parasitic oscillations, pin 5 is also capacitively coupled to pin 6 through capacitor 81. Suitable values of the elements of the peripheral network of the voltage control oscillator are as follows:

| | | |
|---|---|---|
| R71-5K | R75-1.5K | C81-.001uf |
| R72-2.4K | R77-4.7K | |
| C73-300pf | R79-5.6K | |

With respect to input resistance 67, a 50K potentiometer can be suitably used.

The output of voltage control oscillator 69, seen at pin 3 thereof, is connected to the input of amplifier circuit 11 through current limiting resistor 83. Amplifier circuit 11 comprises NPN transistor 85, the base electrode of which is the input terminal of the amplifier circuit. The emitter electrode of transistor 85 is connected to power line 17 and the collector electrode is connected to a collector circuit comprised of parallel resistors 87, 89 in parallel combination with the primary winding 91 of transformer 83. To provide a dc block to primary winding 91, capacitor 93 is connected between the primary winding and the collector electrode of transistor 85. Secondary winding 95 of transistor 13 is in turn connected as shown to the vehicle tail light circuit, and to provide a nonconductive path to any dc voltage on the tail light circuit the secondary winding is grounded through dc block capacitor 97. Transformer 17 is chosen to effect a match between the line impedance of the tail light circuit and the impedance looking into the collector circuit of amplifier 11.

Amplifier circuit 11 also contains bias resistor 99 connected between power line 17 and the base electrode of transistor 85, and capacitor 101 connecting the emitter electrode to ground for filtering out spurious transients.

Thus, it can be seen that the ac output from voltage control oscillator 69, which is frequency modulated in accordance with the temperature transducer voltage developed at output 39 of the temperature transducer circuit, is amplified by amplifier circuit 11 and impressed on the tail light circuit of the vehicle through impedance matching and isolation transformer 13. This frequency modulated ac signal is thus electrically conducted to the detection circuit B shown at the lower portion of FIG. 2.

Turning now to the detection circuit, there is shown a frequency demodulation circuit F in electrical connection with amplification and meter calibration circuit G, the output of which is connected to meter 111. Both of these circuits are connected to power line 17a which carries a regulated voltage stepped down from power line 15a; power line 15a is in turn connected to the 12 volt voltage supply common to the temperature sensing circuit. The voltage on power line 17a is preferably regulated to 10 volts which regulation is achieved by 3 terminal voltage regulator 21a connected between power lines 15a and 17a. The connection of the voltage regulator is the same as in the temperature sensing circuit with the output of the regulator of the regulator being connected to ground through resistors 23a and 25a, and resistor 25a being variable for adjusting the value of the regulated output voltage. Again, to filter out transient voltages, filter capacitors 27a and 29a are ground connected to the input and output lines of the voltage regulator.

The frequency demodulation circuit F has input terminal 113 to which is connected the vehicle tail light circuit carrying the ac frequency modulated signal from the temperature sensing circuit. This demodulation circuit has a standard linear integrated circuit 115 operable as a FM demodulator. A suitable integrated circuit for this purpose is the Signetics phase lock loop 565 integrated circuit operated in the FM demodulator mode. Again, the pin designations shown in the drawings are standardized designations.

The arrangement of the peripheral circuitry connected to integrated circuit 115 is shown in the drawing and includes bias resistors 117 and 119 for biasing input pins 2 and 3 according to manufacturer's recommendations Preferably, resistors 117 and 119 are chosen to bias input voltage to about one-third of the supply voltage developed on power line 17a, which as stated is preferably 10 volts. Resistor 121 is advantageously provided in series with pin 2 to increase the impedance looking from input 113, and resistor 122, equal in value to resistor 121, is necessarily connected in series to terminal 3 in order to equalize the voltages at terminals 2 and 3, essentially inputs to a phase detector, thereby eliminating any drift of the output as seen at output pin 7. It is seen that input 113 is capacitively coupled to pin 2 by dc block capacitors 123 and 124, and since it is desirable to operate integrated circuit 115 in a saturated condition, input 113 is further shunted by clipper diodes 125 and 127. An external RC circuit for tuning the center frequency of the integrated demodulation circuit 115 is comprised of resistors 129 and 131 connected between pin 8 of integrated circuit 115 and power lines 17a, and capacitor 133 connected between pin 9 and ground. Resistor 131 is made variable and is preferably a potentiometer such that the RC time constant and hence center frequency of the overall circuit is capable of adjustment. Capacitor 135, connected between power line 17a and pin 7, combines with resistor 129, 131 and an additional internal resistance in integrated circuit 115 to form a single pole loop filter which limits the upper frequency range of the demodulator. This is to eliminate spurious high frequencies, such as alternator noise, generated by the vehicle. Preferably, capacitor 135 is chosen for a cut off frequency of approximately 30 KHz. To prevent parasitic oscillations, there is additionally provided capacitor 136 connected between pins 7 and 8 of integrated circuit 115.

It is seen that pin 10 of integrated circuit 115 is connected directly to power line 17a, and that pin 1 is grounded. In order to operate integrated circuit 115 in the FM demodulation mode pins 4 and 5 are connected together, which internally connects the internal voltage control oscillator directly to the internal phase detector. The change in output voltage at pin 7 will be proportional to the frequency of the input voltage at input terminal 113 so long as that frequency is within the range of the demodulating circuit.

It has been determined that the peripheral elements of integrated circuit 115 would preferably have the following values:

| R117-10K | R119-4.7K | R121-4.7K |
|---|---|---|
| R122-4.7K | C123-.01uf | C124-.01uf |
| R129-2.0K | R131-5K | C133-3,000pf |
| C135-.068uf | C136-.001uf | |

The amplification and calibration circuit G is essentially comprised of operational amplifier 141 having the customary pin notation as shown and having its input lead at pin 2 connected to the output of integrated circuit 115 (pin 7) through resistor 143. Input pin 3 of the operational amplifier is adjustably biased by means of the resistive network comprised of resistors 145, 146 and variable resistor 147; this network is connected to power line 17a carrying a positive 10 volts. A feedback loop consisting of resistors 149 ad 151 is connected between output pin 6 and input pin 2 of operational amplifier 141 with resistor 149 being made variable in order that the amplifier gain may be adjusted. It is also seen that pins 1 and 8 of the operational amplifier are connected through capacitor 153, that pin 7 is connected to power line 17a, and that pin 4 is grounded. The output of the amplifier which is proportionally related to the temperature in the refrigeration compartment is connected through current limiting resistor 155 to a temperature condition indication means, such as ammeter 111, which is mounted in the vehicle cab so that it can be observed by the operator of the vehicle.

The operation of amplifier and calibration G circuit can readily be seen in that a voltage difference between pins 2 and 3 of operational amplifier 141 will be amplified according to the gain of the feedback circuit and appear at output pin 6 for driving ammeter 111. Meter 111 can be zeroed to a given ambient temperature within the refrigeration compartment of the vehicle by adjusting variable resistor 147 such that the biased voltage at pin 3 of operational amplifier 141 equals the voltage developed at pin 2 as a result of an ouput from the frequency demodulating circuit. A full scale adjustment on meter 111 can then be made by artifically creating an outer limit temperature condition at the temperature sensing circuit and adjusting the gain of amplifier circuit G through variable resistor 149 until meter 111 points to a full scale reading.

It has been established that suitable values for the peripheral elements of the amplifier circuit G are as follows:

| R143-20K | R145-20K | R146-10K |
|---|---|---|
| R147-5K | R149-250K | R151-316K |
| C153-.1uf | C153-30pf | R155-9.1K |

Referring to FIG. 3 of the drawings, there is shown the detailed schematic of an alarm module which can be provided as an additional means of warning of a temperature condition change in the refrigeration compartment of the vehicle. This module would preferably be mounted on the trailer portion of a tractor trailer truck such that a warning alarm would be sounded in the event the temperature condition within the refrigeration compartment of the tractor deteriorated beyond a predetermined condition. Thus, a temperature condition warning means is provided for when a vehicle operator is not available for monitoring the visual temperature condition indication means mounted in the cab of the vehicle.

The preferred arrangement of the electronic circuitry of the alarm module unit is shown in FIG. 3. With respect to that circuit, it can readily be seen that demodulation circuit F' having input 113' is identical to the demodulation circuit F of the above-described detector circuit of FIG. 2. Power line 160 of the demodulation circuit is shown as being connected to a 12 volt voltage supply through resistor 163 and regulated, preferably to a positive 10 volts, by zener diode 165 shunted by capacitor 167 for eliminating spurious voltage transients. The output 169 of the frequency demodulation circuit is connected to operational amplifier 171 through resistor 173 with the opposite input of operational amplifier 171 at pin 3 being voltage biased through a resistive network comprised of fixed resistors 175 and variable resistance 177. The gain of this amplifier stage of the circuit is determined by the resistive values of resistors 179 and 180 in the feedback loop connecting output 179 to pin 2 of the operational amplifier. Output 179 being proportionally related to the temperature in the refrigeration compartment of the vehicle is then utilized to drive audio alarm 181, and preferably a visual indicator such as lamp 183, through an intervening logic circuit comprised essentially of operational amplifiers 185, 187 and OR gates 189, 191, 193, ad 195.

Specifically, output 179 is connected through current limiting resistor 199 to the pin 2 negative input of operational amplifier 185 and the pin 3 positive input to operational amplifier 187. The opposite input pins of these operational amplifiers are voltage biased through resistive networks connected to power line 160; as can be seen from the drawing the resistive networks are comprised of fixed resistor 201 and variable resistor 203 in the case of operational amplifier 185, and fixed resistor 205 and variable resistor 207 in the case of operational amplifier 187.

Pin 8 of operational amplifiers 185 and 187 are connected together so as to provide a common output 209 at output pin 6 of operational amplifier 185. It is noted that, because operational amplifiers 185 and 187 are in an open loop and thus high gain condition, approximately the maximum available voltage of 10 volts is developed at output 209 when the voltage inputted to operational amplifiers 185 and 187 from demodulation circuit G is below the bias voltage at pin 3 of operational amplifier 185 and above the bias voltage at pin 2 of operational amplifier 187. An input outside of this voltage range causes output 209 to go to zero volts, thereby activating audible alarm 181 and indicator light 183 through the intervening logic circuit. By adjusting variable resistors 203 and 207 upper and lower set points can be established for activating the alarm circuit.

Cross-coupled OR gates 189 and 191 essentially define an R-S flip-flop circuit. The flip-flop circuit is activated through capacitor 211 when output 209 is driven to zero volts by virtue of the input voltage to the operational amplifier exceeding either the upper or lower set points as determined by variable resistors 203 and 207. The transition of output 209 to zero volts momentarily drives the input voltage to the R-S flip-flop at 213 to zero volts thereby setting the R-S flip-flop circuit for driving audible alarm 181 through inverting OR gate 195. After the input voltage at 213 is re-established to a positive value as determined by the time constant associated with capacitor 211 and resistor 215, the R-S flip-flop is in a condition to be reset by depressing reset button 217 which drives the input to OR gate 191 at 217 to a zero level. Upon resetting the flip-flop circuit, the audible alarm 181 is turned off. It should be noted that input 217 of OR gate 191 is capacitively grounded through capacitor 219 in order to insure that the flip-flop circuit is properly set when the power at power line 160 is initially turned on.

A zero voltage at output 209 also activates indicating light 183 through OR gate 193. Because of the direct coupling from output 209, indicating light 183 is not deactivated when the flip-flop is reset for disengaging the audible alarm. Indicating light 183 will only be extinguished by a positive voltage at output 209 which can only occur when the voltage to operational amplifiers 185 and 187 returns to a level between the upper and lower set points of the amplifiers.

To describe the overall operation of this circuit, the temperature in the refrigeration vehicle establishes the voltage inputted to operational amplifiers 185 and 187; the upper and lower set points as determined by variable resistors 203 and 207, respectively, represent the upper and lower acceptable temperature limits within the refrigeration compartment. When the temperature exceeds one of these predetermined limits, audio alarm 181 and visual indicator 183 will be activated thereby indicating to someone in the vicinity of the vehicle of the existence of an unacceptable temperature condition within the refrigeration compartment. The alarm can then be deactivated by simply depressing reset switch 217. It is also understood that the output from OR gate 193 could additionally be used to activate an R-F link for warning a person not within the hearing range of the audio alarm, and that the entire alarm circuit could be deactivated by an externally provided switch.

Metering circuit 221 is provided for selectively setting the upper and lower temperature set points, and for monitoring the temperature within the refrigeration compartment. This circuit is preferably comprised of meter 223 suitably mounted to the tractor portion of the vehicle and connected to inverting operational amplifier 225 through current limiting resistor 227. The input to the inverting amplifier is switchably connected directly to output 179 of operational amplifier 171 for reading temperature, to input pin 3 of operational amplifier 185 for reading the upper set point voltage, and to pin 2 of operational amplifier 187 for reading the lower set point voltage. As shown, metering circuit 121 is switchably connected to these respective circuits through three-way switch 129. The standard pin notation and peripheral wiring of operational amplifier 225 is also shown.

Metering circuit 221 is calibrated by setting three-way switch 229 to the middle position for connection with output 179 of operational amplifier 171. With the temperature of the refrigeration compartment at its ambient condition, variable resistor 177 is adjusted such that meter 223 is in a centered position; then with the temperature condition arbitrarily set at a predetermined extreme level, variable resistor 181 is adjusted to adjust the gain of amplifier 171 until meter 223 reads full scale. With the meter thusly calibrated, switch 229 can be set first to the upper position for connection with pin 3 of operational amplifier 185 whereupon variable resistor 203 can be adjusted to a suitable upper temperature reading as determined by meter 223. With switch 229 switched in connection with pin 2 of operational amplifier 187, the lower temperature set point can be similarly set by adjustment of variable resistor 207.

The present invention provides a novel remote temperature change warning system having a temperature condition sensing circuit and remotely located temperature detection circuit, or circuits, which can be electrically connected to one another through the existing wiring of a refrigeration vehicle. The present invention provides a highly reliable detection system which can be continually monitored for an indication of unacceptable temperature levels either by the operator of the vehicle, or a person in reasonably close proximity to the vehicle.

Although the present invention has been described in considerable detail in the above specification, it is not intended that the invention be limited to such detail, except as may be necessitated by the appended claims.

What I claim is:

1. A remote temperature change warning system for a refrigeration vehicle having existing vehicular wiring comprising
   a temperature sensing circuit located in the refrigeration compartment of said refrigeration vehicle, said temperature sensing circuit comprising
   a linear electrical transducer means for producing at the output thereof a d.c. electrical signal proportional to the temperature in said refrigeration compartment,
   a frequency modulation circuit means in electrical connection with the output of said electrical transducer means, said frequency modulation circuit means generating at its output an a.c. electrical signal having a frequency proportional to the d.c. electrical signal produced by said electrical transducer means whereby an a.c. electrical signal is generated by said temperature sensing circuit having an audio frequency proportional to the temperature in said refrigeration compartment, and
   means for approximately matching the output impedance of said temperature sensing circuit to the impedance of said existing vehicular wiring, and
   a detection circuit located on said vehicle remote from said temperature sensing circuit, said detection circuit comprising
   a frequency discriminator means for producing a d.c. electrical signal which is proportional to the frequency of an inputted a.c. electrical signal, and a temperature condition indication means electrically driven according to the level of the d.c. electrical signal produced by said frequency discriminator means, the output of said temperature sensing circuit and the input of said detector circuit being coupled to and electrically connected through the existing electrical wiring of said refrigeration vehicle whereby the indication on said temperature condition indication means is electrically determined by the temperature in the remote refrigeration compartment of said refrigeration vehicle.

2. The remote temperature change warning system of claim 1 wherein said temperature condition indication means includes a visual indicator disposed for continual monitoring by the vehicle operator for a malfunction in the vehicle's refrigeration temperature control system.

3. The remote temperature change warning system of claim 1 wherein said detector circuit includes a means for balancing said visual indicator relative to a predetermined ambient temperature in said refrigeration compartment.

4. The remote temperature change warning system of claim 1 wherein said temperature condition indication means includes an audio indicator disposed externally of said refrigeration vehicle and present to be activated when the temperature in said refrigeration compartment exceeds a predetermined temperature limit whereby the operator of said vehicle would be warned of a malfunction in the vehicle's refrigeration temperature control system if he is in the vicinity of the vehicle but not necessarily in the driver's compartment.

* * * * *